United States Patent [19]

Kage et al.

[11] Patent Number: 5,386,330

[45] Date of Patent: Jan. 31, 1995

[54] TAPE RECORDER CASSETTE LOADING MECHANISM IN WHICH A PROJECTION MATES WITH A HOLE IN A CASSETTE UPPER SURFACE

[75] Inventors: Shingo Kage, Kobe; Yoshikazu Yamano; Yasunari Toyama, both of Osaka, all of Japan

[73] Assignee: Matsushita Electric Industrial Co., Ltd., Osaka, Japan

[21] Appl. No.: 986,779

[22] Filed: Dec. 8, 1992

[30] Foreign Application Priority Data

Dec. 10, 1991 [JP] Japan .................. 3-325604

[51] Int. Cl.⁶ ............................................ G11B 5/008
[52] U.S. Cl. .................................. 360/96.5; 360/94
[58] Field of Search ................ 360/90, 93, 94, 95, 360/96.1–96.6, 99.02, 99.03, 99.06, 99.07; 369/77.1, 77.2

[56] References Cited

U.S. PATENT DOCUMENTS

| | | | |
|---|---|---|---|
| 4,984,108 | 1/1991 | Grant et al. | 360/94 |
| 5,036,414 | 7/1991 | Kunze | 360/96.5 |
| 5,046,169 | 9/1991 | Tsujino | 360/96.5 |
| 5,101,304 | 3/1992 | Sakumoto et al. | 360/96.5 |
| 5,105,320 | 4/1992 | Hayashi | 360/96.5 |
| 5,179,481 | 1/1993 | Kunze | 360/96.5 |
| 5,231,553 | 7/1993 | Weber et al. | 360/96.5 |

FOREIGN PATENT DOCUMENTS

| | | |
|---|---|---|
| 2637141 | 8/1976 | Germany . |
| 3832672 | 9/1988 | Germany . |
| 2108003 | 3/1979 | United Kingdom . |
| 2196168 | 6/1987 | United Kingdom . |

*Primary Examiner*—Stuart S. Levy
*Assistant Examiner*—Jefferson Evans
*Attorney, Agent, or Firm*—Ratner & Prestia

[57] ABSTRACT

A tape recorder operates with a Digital Method Compact Cassette (DCC) where the DCC has a hole in its upper surface. When the DCC is placed in the tape recorder, the DCC is moved parallel to the direction of insertion of the DCC and is then moved down. The tape recorder also includes a holder for holding the DCC, a first supporting member for supporting the holder, a projection disposed on the first supporting member, a transfer part for transferring the DCC in a direction parallel to the direction of insertion, a second supporting member rotatably mounted on the transfer part for supporting the lower surface of the DCC, and a spring for urging the second supporting member toward the lower surface of the DCC. The projection mates with the hole in the upper surface of the DCC. The second supporting member has an extending part and the first supporting member has a contact surface which makes contact with the extending part of the second supporting member when the parallel movement of the DCC is completed. Under operation, when the DCC moves in the parallel direction, the DCC is maintained between the first supporting member and the second supporting member. When the DCC then moves perpendicularly, the second supporting member does not obstruct the perpendicular movement of the DCC.

2 Claims, 6 Drawing Sheets

TAPE RECORDER CASSETTE LOADING MECHANISM IN WHICH A PROJECTION MATES WITH A HOLE IN A CASSETTE UPPER SURFACE

FIELD OF THE INVENTION

The present invention relates in general to a tape recorder. In particular, a tape recorder which includes a tape cassette loading mechanism is disclosed.

BACKGROUND OF THE INVENTION

Presently, many digital audio related devices are becoming popular. At present, two methods relating to high quality digital-recording and digital-playback tape recorders are suggested due to technology development. One method is referred to as R-DAT and uses a rotary head. Another method is referred to as S-DAT and uses a stationary head. In particular, since S-DAT uses a stationary head, the structure of both the head and the tape cassette of a S-DAT tape recorder is similar to that of a conventional analog method tape recorder. Because of this similarity, the commercialization of a tape recorder which can record and playback both digital and analog signals is desirable.

A tape recorder which can record and playback both digital and analog signals has been proposed. A conventional analog method compact cassette (so called ACC) has a thick part having a front opening for receiving a magnetic head and a pinch roller. A digital method compact cassette (so called DCC) has a shutter covering a front opening for receiving a magnetic head and a pinch roller. The shutter covers the opening when the cassette is not in use, and slides either in the direction of magnetic tape travel or in the reverse direction so that the magnetic head and pinch roller can be received during use. This proposed tape recorder can be used for both DCC and ACC.

Since differently shaped tape cassettes (that is ACC and DCC) are recorded and played back by a single tape recorder, a loading structure suitable for inserting, supporting and removing the two differently shaped tape cassettes is desirable particularly for a tape recorder for car use having a tape cassette loading structure.

Figure 5:
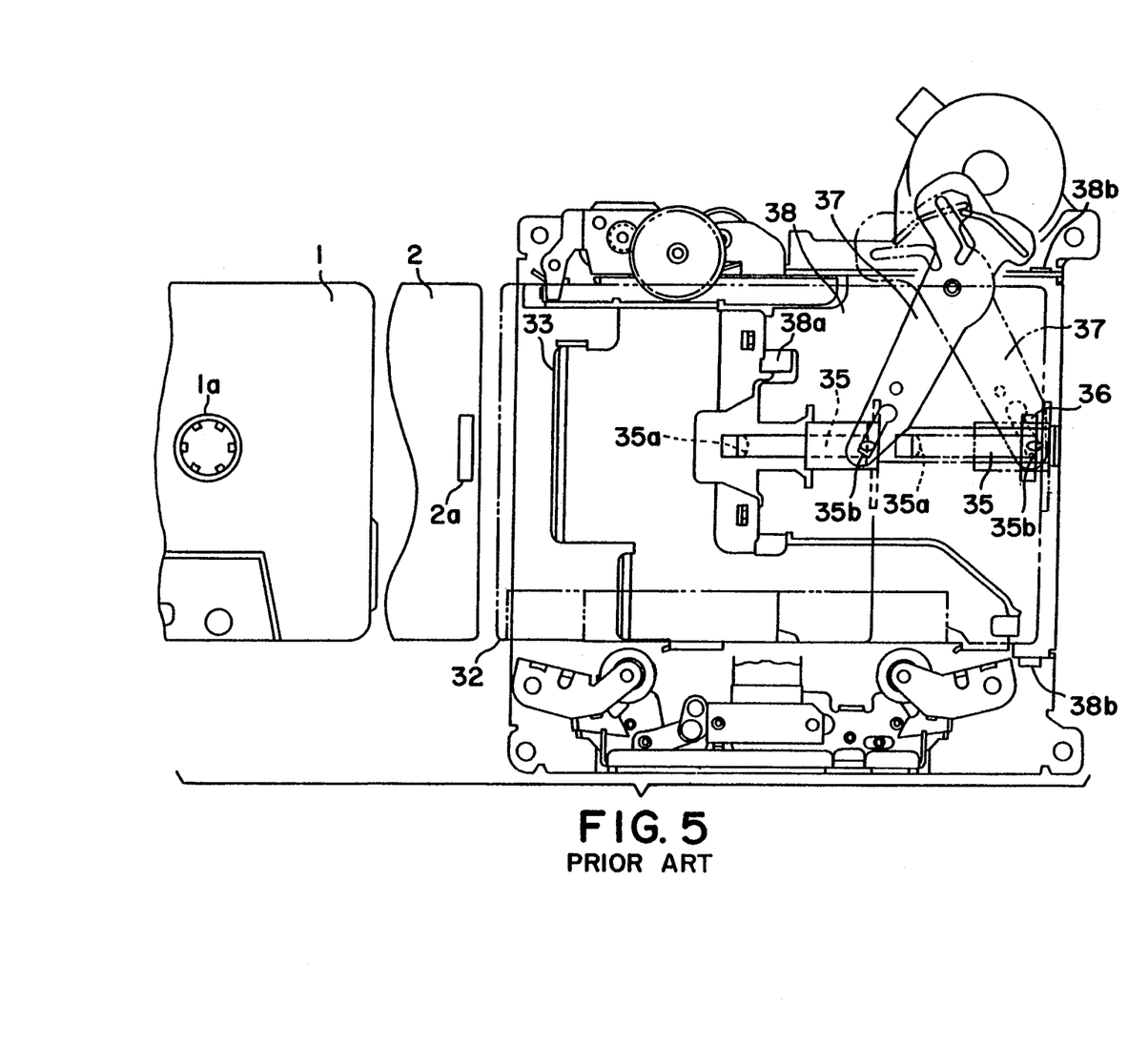
FIG. 5 is a plane view of a conventional tape recorder.
Figure 6:
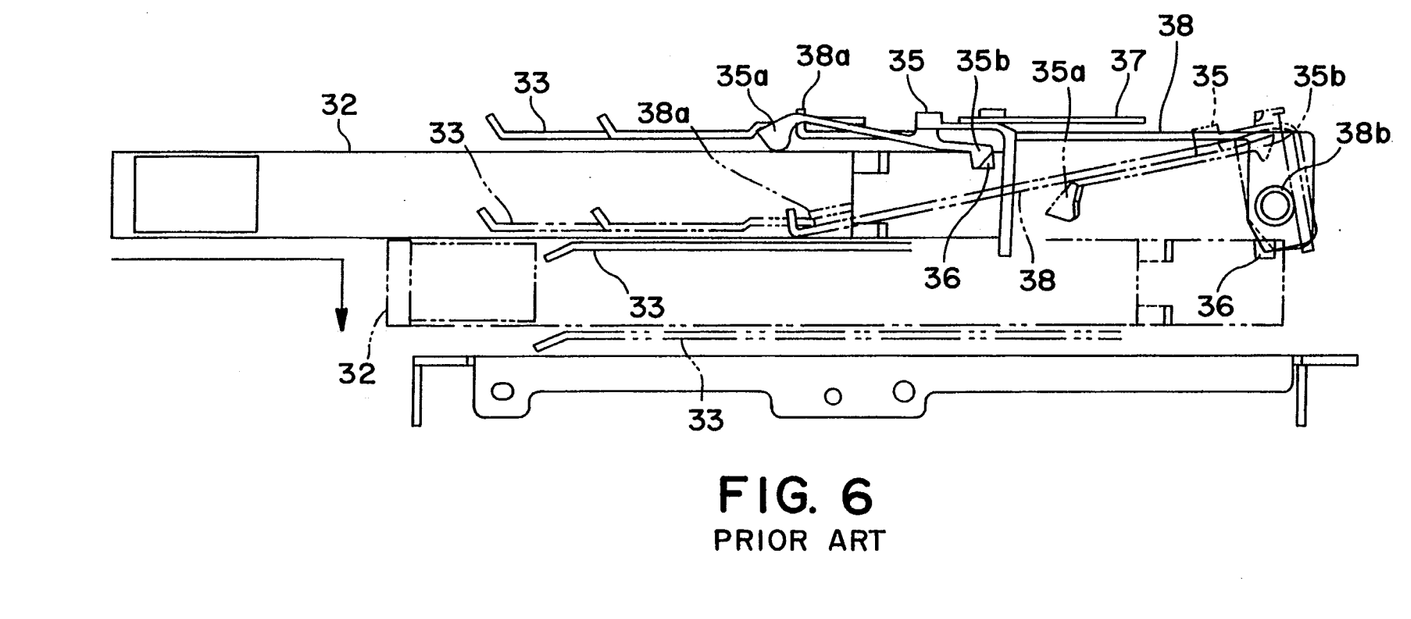
FIG. 6 is a side view of the conventional tape recorder.

An exemplary loading structure which is suitable for both ACC and DCC is shown in FIG. 5 and FIG. 6. Holder 33 holds both ACC 1 and DCC 2. ACC 1 has a hole 1a for inserting a reel axis. Engaging member 35 supports both ACC 1 and DCC 2. The engaging member 35 has a projection 35a at one end of the engaging member 35. The projection 35a mates with the hole 1a of ACC 1. Grip slot 2a mates with a projection 35b disposed on the other end of the engaging member 35. Transfer means 37 transfers both ACC 1 and DCC 2 in the direction of tape cassette insertion. One end of the supporting member 38 is rotatably supported at rotation part 38b, and another end of the supporting member 38 has a supporting part 38a. The supporting part 38a supports the holder 33 so that the holder 33 moves to the direction perpendicular to the upper surface of both ACC 1 and DCC 2.

Both ACC 1 and DCC 2 are transferred from a first position where both ACC 1 and DCC 2 are supported by the projection 35a or projection 35b of the engaging member 35 to the right direction by the transfer means 37. After moving in the right direction, the supporting member 38 rotates counter-clock-wise around the rotation part 38b, whereby the holder 33 is transferred downward to a second position where recording and playback is accomplished. This transfer occurs in the direction of the arrow shown in FIG. 6.

In the above-described tape recorder, while both ACC 1 and DCC 2 are supported within the transfer means 37 by mating the hole 1a with the projection 35a when ACC 1 is used or by mating the grip slot 2a with the projection 35b when DCC 2 is used, a depth of the grip slot 2a of the DCC 2 is shallower than that of the hole 1a. Moreover, in order for ACC 1 and DCC 2 to both slide smoothly within the holder 33, the holder 33 is designed so that there is a gap left in the upwards and downwards directions when either ACC 1 or DCC 2 is loaded within the holder 33. Because of this structure, it was especially difficult to maintain a stable engagement between the grip slot 2a of the DCC 2 and the projection 35b. As a result of disengagement, undesirable movement occurred.

SUMMARY OF THE INVENTION

A tape recorder is disclosed which stably maintains a tape cassette within a transfer means as the tape cassette moves in a direction parallel to the direction of insertion. Afterwards, the tape cassette may also move smoothly in a direction perpendicular to the upper surface of the tape cassette.

The tape recorder accepts a tape cassette which has a hole in an upper surface of the tape cassette. The tape cassette moves in a direction parallel to the direction of insertion and then moves in a direction perpendicular to the upper surface of the tape cassette to place the tape cassette into a playback position. The tape recorder comprises (a) a holder for holding the tape cassette, (b) first supporting means for supporting the holder so that the holder moves in a direction perpendicular to the upper surface of the tape cassette, (c) a projection disposed on the first supporting means, the projection mating with the hole in the upper surface of the tape cassette at a mating position, (d) means for transferring the tape cassette from the mating position to a direction parallel to the direction of insertion of the tape cassette, (e) second supporting means, disposed adjacent to the lower surface of the tape cassette, for supporting the lower surface of the tape cassette, the second supporting means mounted on the transfer means so that when the tape cassette moves in the direction perpendicular to the upper surface of the tape cassette, the second supporting means does not obstruct the perpendicular movement of the tape cassette, and (f) urging means for urging the second supporting means so that the second supporting means keeps contact with the lower surface of the tape cassette.

According to another aspect of the present invention, in the tape recorder described above, the second supporting means is rotatably mounted on the transfer means.

According to still another aspect of the present invention, in the tape recorder described above, the second supporting means has an extending part on the same side as the direction of insertion of the tape cassette, and the first supporting means has a contact surface which contacts with the extending part of the second supporting means when parallel movement of the tape cassette is accomplished so that the second supporting means does not make contact with the lower surface of the tape cassette as the tape cassette moves perpendicularly.

Thus, a tape recorder is provided, wherein, when the tape cassette moves in the parallel direction, the tape cassette is stably maintained within the transfer means because the tape cassette is maintained between the first supporting means and the second supporting means, while when the tape cassette moves perpendicularly. Furthermore, the tape cassette moves smoothly without obstruction by the second supporting means because the second supporting means runs away from the lower surface of the tape cassette after parallel movement is accomplished.

Above and other features and advantages of the invention will become apparent from the following description of an exemplary embodiment thereof with reference to the drawings.

BRIEF DESCRIPTION OF THE DRAWINGS

In the drawings, identical numerals indicate identical or corresponding parts.

DETAILED DESCRIPTION OF THE PREFERRED EMBODIMENTS

Figure 1:
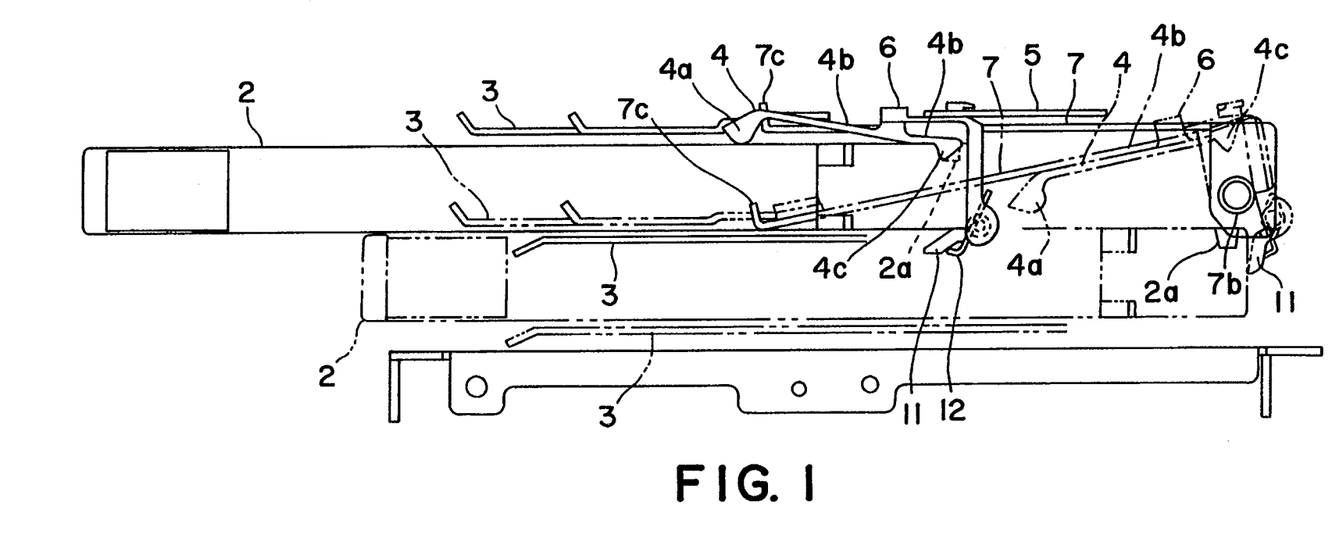
FIG. 1 is a side view of a first exemplary embodiment of the present invention.
Figure 2:
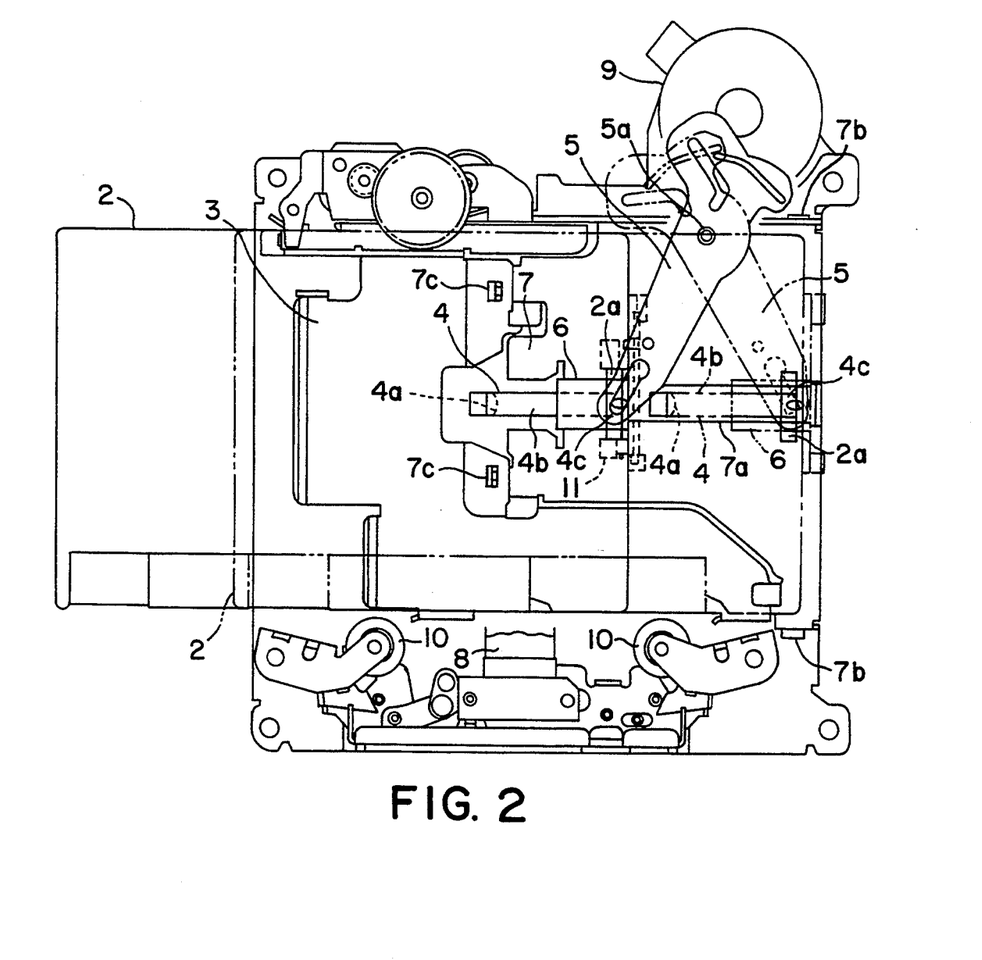
FIG. 2 is a plane view of the first exemplary embodiment of the present invention.
Figure 3A:
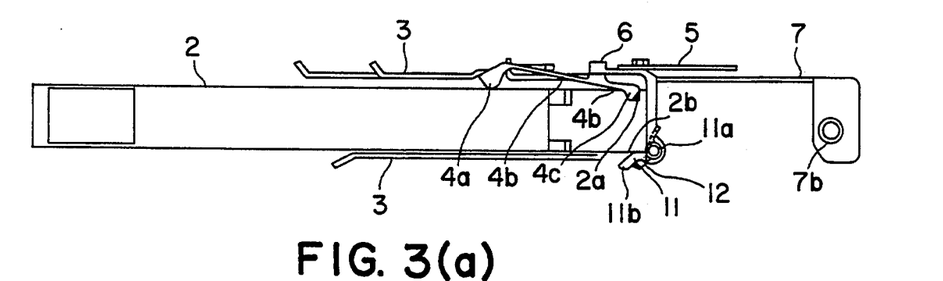
FIGS. 3(a), (b), (c) show operational conditions of the first exemplary embodiment of the present invention.
Figure 3B:
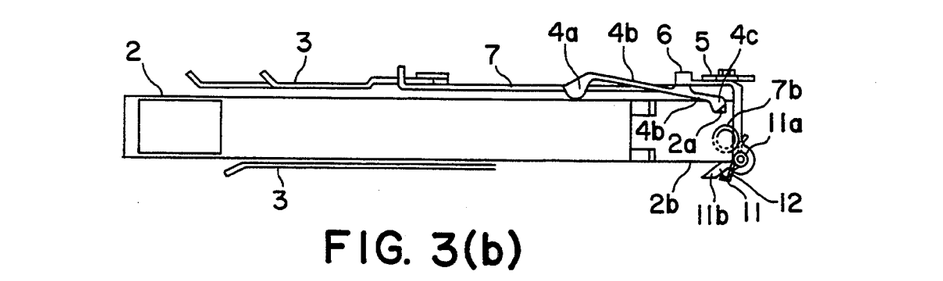
Figure 3C:
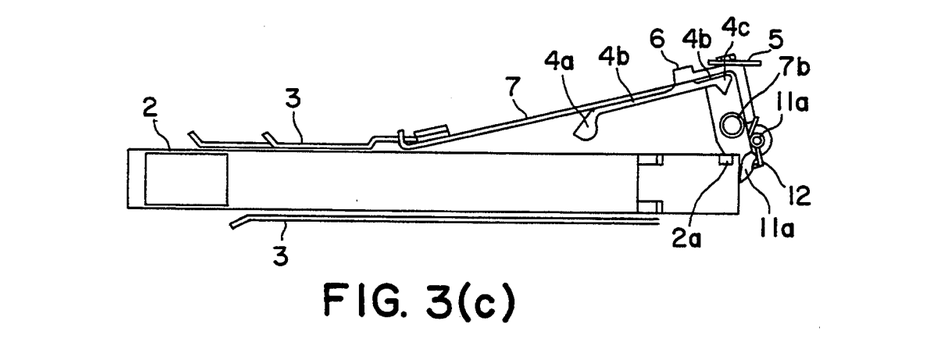

A first exemplary embodiment of the present invention is illustrated by FIGS. 1 to 3. Holder 3 holds DCC 2. Engaging member 4 engages DCC 2. Slider member 6 is formed integrally with the engaging member 4. The slider member 6 is connected with the arm member 5. A transfer means includes the arm member 5, the engaging member 4, and slider member 6. The slider member 6 mates with a lengthy hole 7a of a first supporting member 7 so that the slider member 6 slides within the hole 7a. Magnetic head 8 records or plays back a tape. Driving motor 9 rotates a capstan (not shown in drawings). The driving motor 9 drives the DCC 2 which is caught between the capstan and the pinch roller 10. The engaging member 4 includes a first projection 4a, a second projection 4c, and an arm part 4b connecting between the first projection 4a and the second projection 4c. The arm part 4b has resilient properties. The second projection 4c mates with a grip slot 2a of the DCC 2. The first projection 4a mates with a hole 1a (for inserting a reel axis) of ACC 1 shown in FIG. B. The first projection 4a and the second projection 4c desirably project into the holder 3 and contact with the DCC 2 or ACC 1 inserted within the holder 3. A second supporting member 11 is mounted on the slider member 6 rotatably around axis 11a and urged toward the lower surface of DCC 2 or ACC 1 by a spring 12 so that the second supporting member 11 supports the lower surface of the DCC 2 or ACC 1 inserted within the holder 3.

Operation of the first exemplary embodiment of the present invention is now explained. When the DCC 2 is inserted into the holder 3, the DCC initially makes contact with the engaging member 4. The arm part 4b of the engaging member 4 then bends because of its resilient properties. After that, the DCC 2 is maintained by the slider member 6 because of mating of the grip slot 2a of the DCC 2 with the second projection 4c of the engaging member 4. At the same time, a lower surface 2b of the DCC 2 is supported from the bottom by the arm part 11b of the second supporting member 11 because the arm part 11b is urged toward the lower surface 2b of DCC 2 by the spring 12 as shown in FIG. 3(a). Then the DCC 2 is moved in the direction parallel to the direction of insertion of the DCC 2 by the movement of the slider member 6 since the arm member 5 which is connected to the slider member 6 rotates around an axis 5a counter-clockwise as shown in phantom in FIG. 2. FIG. 3(b) illustrates aspects of the present invention after parallel movement of the DCC 2 is accomplished. The DCC 2 within the holder 3 is then moved in a direction perpendicular to the upper surface of the DCC 2 (downward direction) since the first supporting member 7 rotates around the rotation axis part 7b, whereby the holder 3 is lowered by the downward force caused by the downward movement of the supporting part 7c of the first supporting member 7 as shown in phantom in FIG. 1. Due to this perpendicular movement of the DCC 2, the arm part 11b of the second supporting member 11 does not obstruct the perpendicular (downward) movement of the DCC 2 since the arm part 11b rotates around the axis 11a counter-clock-wise against the urging force of the spring 12. The rotation of arm part 11b is due to the force caused by the downward movement of the lower surface 2b of the DCC 2. FIG. 3(c) illustrates aspects of the present invention after perpendicular movement of the DCC 2 is completed. DCC 2 is shown at a position where recording and playback is done.

According to the first exemplary embodiment of the present invention, when the DCC 2 moves in the parallel direction, the DCC 2 is stably maintained within the holder 3 because the DCC 2 is caught between the first supporting member 7 and the second supporting member 11. During perpendicular motion of the DCC 2, the DCC 2 moves smoothly without obstruction by the second supporting member 11 because the arm part 11b of the second supporting member 11 rotates around the axis 11a counter-clockwise and moves away from the lower surface 2b of the DCC 2.

The first exemplary embodiment is described above using DCC 2. Using ACC 2 differs only in that hole 1a of ACC 1 mates with the first projection 4a of the engaging member 4. This is in contrast with the mating of the grip slot 2a of the DCC 2 with the second projection 4c in case of using DCC 2. In both cases, similar effects are obtained.

Figure 4A:
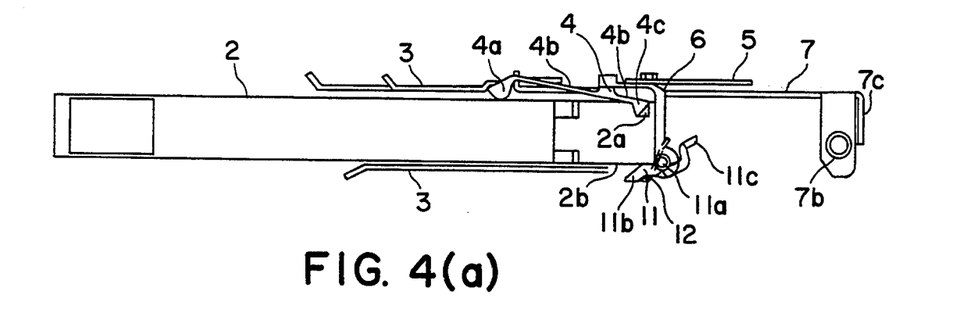
FIGS. 4(a), (b), (c) show operational conditions of a second exemplary embodiment of the present invention.
Figure 4B:
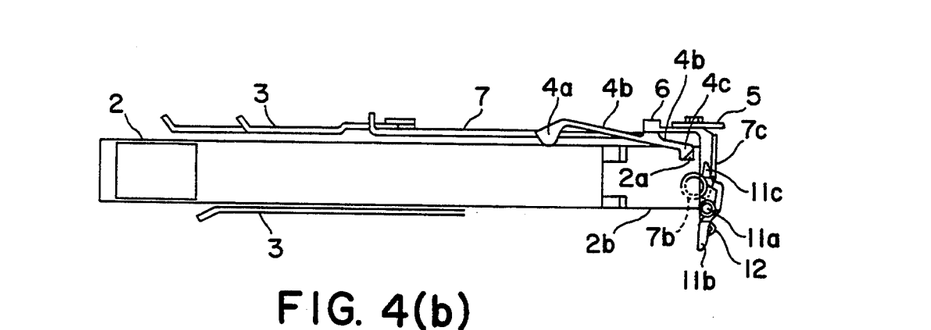
Figure 4C:
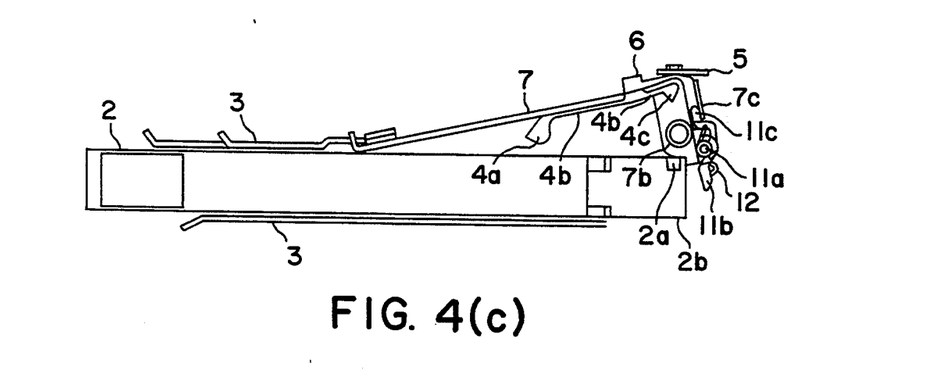

A second exemplary embodiment of the present invention is illustrated by FIG. 4. FIG. 4 illustrates aspects of the present invention using DCC 2. The second exemplary embodiment differs from the first exemplary embodiment in that the second supporting member 11 mounted on the slider member 6 has an extending part 11c at the opposite side of the arm part 11b in addition to the arm part 11b which support the lower surface 2b of the DCC 2. When the DCC 2 is inserted into the holder 3, the DCC 2 initially makes contact with the engaging member 4. Then, the arm part 4b of the engaging member 4 bends. Next, the DCC 2 is maintained by the slider member 6 because of mating of the grip slot 2a of the DCC 2 with the second projection 4c of the engaging member 4. At the same time, a lower surface 2b of the DCC 2 is supported from the bottom by the arm part 11b of the second supporting member 11. FIG.

3(a) illustrates the DCC 2 positioned between the first supporting member 7 and the second supporting member 11. The DCC 2 is then moved in a direction parallel to the direction of insertion of the DCC 2 by the movement of the slider member 6 until the extending part 11c of the second supporting member 11 makes contact with a contact surface 7c of the first supporting member 7. When the slider member 6 moves further in a parallel direction, the second supporting member 11 rotates around the axis 11a counter-clockwise against urging force of the spring 12. This is because the extending part 11c is pushed by the contact surface 7c. Furthermore, the arm part 11b of the second supporting member 11 goes down to the position where the arm part 11b does not obstruct the downward movement of the DCC 2. FIG. 4(b) illustrates an exemplary embodiment of the present invention after parallel movement of the DCC 2 is completed. The DCC 2 within the holder 3 is then moved in a perpendicular direction since the first supporting member 7 rotates around the rotation axis part 7b. In this perpendicular movement of the DCC 2, the arm part 11b of the second supporting member 11 does not obstruct the perpendicular movement of the DCC 2 because the arm part 11b is positioned so that the arm part 11b does not obstruct the downward movement of the DCC 2 when the DCC 2 begins moving downwardly.

According to this second exemplary embodiment, when the DCC 2 moves in a parallel direction, the DCC 2 is stably maintained within the holder 3 because the DCC 2 is caught between the first supporting member 7 and the second supporting member 11 as in the first exemplary embodiment. After that, when the DCC 2 moves perpendicularly, the DCC 2 moves more smoothly than in the first exemplary embodiment because in this perpendicular movement of the DCC 2, the arm part 11b does not make contact with the lower surface 2b of the DCC 2.

Using the ACC 1 differs only in that the hole 1a of ACC 1 mates with the first projection 4a of the engaging member 4, and an effect which is similar to that described above is obtained.

While the second supporting member 11 rotates counter-clock-wise in the second exemplary embodiment, the direction of rotation of the second supporting member 11 can be changed or structured as long as the arm part 11b moves away from the lower surface 2b of the DCC 2 as DCC 2 moves perpendicularly.

While the invention has been described above through the description with several exemplary embodiments, it should be understood that various changes, suggestions and modifications are readily apparent to one skilled in the art without departing from the spirit and scope of the invention defined by the appended claims.

What is claimed:

1. A tape recorder in which a tape cassette having a hole in an upper surface of said tape cassette is used, wherein said tape cassette is placed in a playback position by being moved in a direction parallel to a direction of insertion and then a direction perpendicular to the upper surface of the tape cassette, said tape recorder comprising:
   (a) a holder for holding the tape cassette;
   (b) first supporting means for supporting the holder so that the holder is movable in the direction perpendicular to the upper surface of the tape cassette;
   (c) a projection disposed on the first supporting means, the projection mating with the hole of the upper surface of the tape cassette when the tape cassette is in a mating position;
   (d) means for transferring the tape cassette from the mating position to the direction parallel to the direction of insertion of the tape cassette;
   (e) second supporting means, separate from the holder and first supporting means and disposed adjacent to a lower surface of the tape cassette, for supporting the lower surface of the tape cassette, the second supporting means rotatably mounted on the transfer means so that when the tape cassette moves in the direction perpendicular to the upper surface of the tape cassette, the second supporting means does not obstruct movement of the tape cassette; and
   (f) urging means for applying force to the second supporting means so that the second supporting means maintains contact with the lower surface of the tape cassette.

2. A tape recorder in which a tape cassette having a hole in an upper surface of said tape cassette is used, wherein said tape cassette is placed in a playback position by being moved in a direction parallel to a direction of insertion and then a direction perpendicular to the upper surface of the tape cassette, said tape recorder comprising:
   (a) a holder for holding the tape cassette;
   (b) first supporting means for supporting the holder so that the holder is movable in the direction perpendicular to the upper surface of the tape cassette;
   (c) a projection disposed on the first supporting means, the projection mating with the hole of the upper surface of the tape cassette when the tape cassette is in a mating position;
   (d) means for transferring the tape cassette from the mating position to the direction parallel to the direction of insertion of the tape cassette;
   (e) second supporting means, disposed adjacent to a lower surface of the tape cassette, for supporting the lower surface of the tape cassette, the second supporting means coupled to the transfer means so that when the tape cassette moves in the direction perpendicular to the upper surface of the tape cassette, the second supporting means does not obstruct movement of the tape cassette, wherein the second supporting means is rotatably mounted on the transfer means, wherein the second supporting means includes an extending part, the first supporting means having a contact surface which contacts with the extending part of the second supporting means when parallel movement of the tape cassette is accomplished so that the second supporting means does not contact with the lower surface of the tape cassette as the tape cassette moves perpendicularly; and
   (f) urging means for applying force to the second supporting means so that the second supporting means maintains contact with the lower surface of the tape cassette.

* * * * *

UNITED STATES PATENT AND TRADEMARK OFFICE
CERTIFICATE OF CORRECTION

PATENT NO. : 5,386,330
DATED : January 31, 1995
INVENTOR(S) : Kage et al.

It is certified that error appears in the above-indentified patent and that said Letters Patent is hereby corrected as shown below:

On the title page item [56], References Cited, FOREIGN PATENT DOCUMENTS, the reference "2108003 3/1979 United Kingdom" should be --2018003 3/1979 United Kingdom--.

Signed and Sealed this

Nineteenth Day of September, 1995

Attest:

BRUCE LEHMAN

Attesting Officer

Commissioner of Patents and Trademarks